(12) United States Patent
Everton

(10) Patent No.: US 6,896,816 B2
(45) Date of Patent: May 24, 2005

(54) CHEMICAL TREATMENT METHOD

(75) Inventor: Michael Everton, Berwick (AU)

(73) Assignee: Alcos Technologies Pty. Ltd. (AU)

( * ) Notice: Subject to any disclaimer, the term of this patent is extended or adjusted under 35 U.S.C. 154(b) by 0 days.

(21) Appl. No.: 10/297,161

(22) PCT Filed: Jun. 1, 2001

(86) PCT No.: PCT/AU01/00655
§ 371 (c)(1),
(2), (4) Date: May 13, 2003

(87) PCT Pub. No.: WO01/92165
PCT Pub. Date: Dec. 6, 2001

(65) Prior Publication Data
US 2003/0173305 A1 Sep. 18, 2003

(51) Int. Cl.$^7$ .................................................. C02F 1/24
(52) U.S. Cl. .................... 210/705; 210/703; 210/704; 210/712; 210/727; 210/738
(58) Field of Search ................................. 210/703–705, 210/712, 726, 727, 738, 205, 221.2, 195.1

(56) References Cited

U.S. PATENT DOCUMENTS

| | | | | |
|---|---|---|---|---|
| 2,793,185 A | * | 5/1957 | Georg et al. ................. | 210/703 |
| 3,179,252 A | * | 4/1965 | Vrablik ....................... | 210/120 |
| 3,446,488 A | * | 5/1969 | Mail et al. ..................... | 261/77 |
| 3,870,635 A | * | 3/1975 | Clarke-Pounder .......... | 210/218 |
| 4,431,531 A | * | 2/1984 | Hollingsworth ............. | 209/170 |
| 4,994,179 A | | 2/1991 | Keeter et al. ............ | 210/195.1 |
| 6,562,240 B1 | * | 5/2003 | Clark .......................... | 210/703 |

FOREIGN PATENT DOCUMENTS

| | | |
|---|---|---|
| EP | 978482 A | 2/2000 |
| FR | 2596748 A | 10/1997 |

* cited by examiner

Primary Examiner—Peter A. Hruskoci
(74) Attorney, Agent, or Firm—Michael Best & Friedrich LLP

(57) ABSTRACT

A method and apparatus is described for separating contaminants from waste material including waste water derived from a chemical processing or manufacturing plant, such as the waste water from a coconut processing plant. The separation method and apparatus involves the use of a mixer to aerate a partially treated waste water material prior to mixing the aerated material with a new supply of waste water to aerate the waste water feed supply for admission to a separation vessel in which the contaminants of the waste water are collected as sludge at the top of the aerated zone for disposal. The treated waste water now substantially free of contaminants is collected in a clean zone for discharge or recirculation. Prior to discharge the partially treated waste water in the clean zone can be recycled through a recirculation loop containing the mixer. The recirculation loop can be operated independently of the rate of supply of new waste water. The advantage of the method and apparatus of this invention is that the treated waste water in the separation vessel can be aerated continuously irrespective of the rate of control of the waste water or even when there is no incoming waste water which prevents the separation tank from becoming fouled with deposited contaminants.

32 Claims, 1 Drawing Sheet

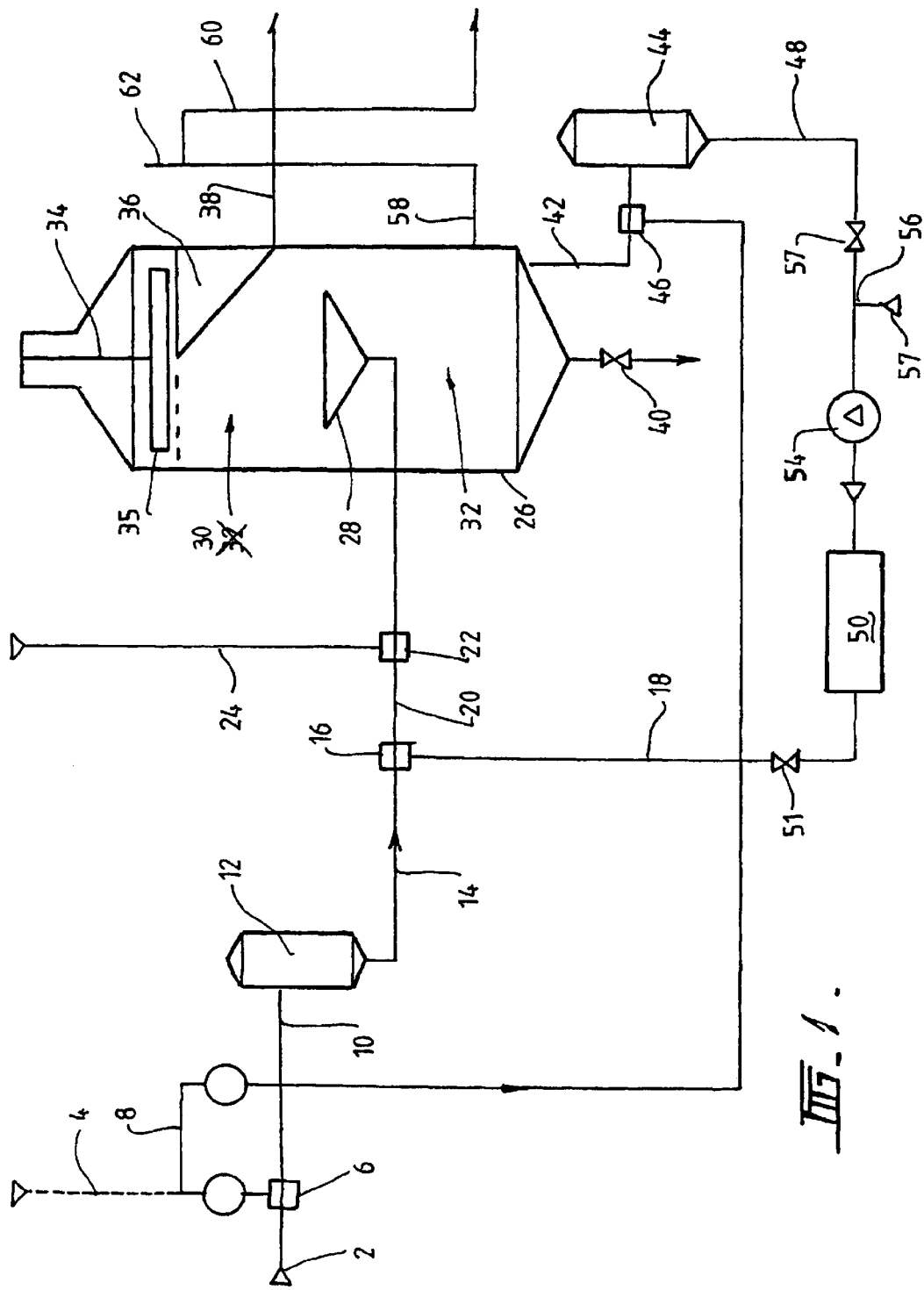
FIG_1

CHEMICAL TREATMENT METHOD

The present invention relates generally to chemical processing of materials in industry and particularly to improvements in individual steps involved in the overall processes used in chemical processing industries, particularly in industries involved in the separation of different materials from each other or the treatment of materials such as for example, the treatment of waste waters or the like to remove contaminants prior to discharging the treated waste waters.

More particularly, the present invention relates to improvements in chemical processing of two or more dissimilar materials where the dissimilar materials are to be separated from each other by method and apparatus which allow the dissimilar materials to be at least partially recycled or recirculated in order to improve the amount and/or rate of separation of the two materials from each other.

Even more particularly, the present invention relates to an improved mixing step as a part of an overall process of separating two or more different materials from each other wherein the rate of mixing the materials with a further material, such as a gas or similar in an aeration step, can be controlled independently of the rate of admission of incoming feed material for subsequent treatment, ie., the improvement relates to the recirculation steps for the different materials, particularly the reincarnation of partially treated materials still containing contaminants.

The present invention finds particular application in methods and apparatus using hydrocyclones to mix two fluids together prior to separating materials from each other as part of the overall processing that involves separation of waste materials where the hydrocyclone mixer can be used more or less continuously at a fixed rate to maintain aeration conditions promoting separation of the contaminants in the waste water even when the supply of incoming waste water is interrupted or terminated thereby obviating the need to clean the separation vessel in which separation of the materials take place due to fouling of the vessel caused by being able to maintain aeration within the vessel and operation of the separation process.

Although the present invention will be described with particular reference to the use of a recirculation loop having a hydrocyclone mixer for aerating at least partially treated waste water in order to maintain aeration conditions in a separation tank when the supply of incoming waste water feed is interrupted or terminated, it is to be noted that the scope of the present invention is not limited to the described embodiment but rather the scope of the present invention is more extensive so as to include other arrangements of the apparatus, other uses of the apparatus and the application of the apparatus and methods in industries other than specifically described.

In co-pending patent application no. PCT/AU98/00691 the use of a hydrocyclone to aerate materials such as waste liquids to aid separation of contaminants from the waste water was described. The hydrocyclone mixers were used in a pre-treatment step to aerate fluids prior to separation of the fluids from each other. It is to be noted that the term "aeration" as used in the present specification is being used in its generic sense and includes the intimate mixing of a water material with any gas or gaseous mixture or combination of gases, such as for example, nitrogen, carbon dioxide, air, oxygen or the like. Accordingly, the use of the word aeration is not limited to oxygen or air only but includes any suitable gaseous materials depending upon the particular application of the invention.

In the previously described methods when incoming feed of material being treated stopped the aeration of this material had to stop also since the aeration means being the hydrocyclone mixer was located in line so that when there was no incoming feed material there was nothing to aerate. This presented problems in the apparatus down stream of the aeration site, such as, in the separation tank included as part of the overall apparatus or plant used in the process of separating materials since the sludge at the top of the separation tank became increasing deaerated as time went by with no aeration since no fresh aeration material was added to the separation tank to maintain the sludge in the aerated condition. This in turn resulted in the particles formerly entrapped or entrained in the air bubbles being released and gradually sinking to the bottom of the separation tank and collecting in the clean zone located at the base of the separation tank. This required the separation tank to be dismantled and cleaned before the process could recommence. Not only was the cleaning of the separation tank costly, it also involved down time since there was a loss of production in that the waste material could not be treated until the tank was cleaned and the separation process was recommenced. Such separation systems used a fixed flow incoming aerated material.

A major drawback of the fixed flow system is that if there is no flow coming forward from the processing plant to the hydrocyclone mixer there is no aeration taking place and therefore no aerated liquid is being processed into the separation tank. With no air to support the sludge on top of the liquid in the separation tank the sludge becomes saturated with liquid and the solids sink to the bottom of the separation tank and enter the clean water zone beneath the diffusion plate. If this is allowed to happen the only way to remove the sunken sludge is to drain the tank and clean by hand.

Additional problems suffered with the previously available system included that the use of the hydrocyclone mixer required an accurate and fixed flow feed rate of incoming feed material for the particular application in which the particular hydrocyclone mixer was being used. This did not allow the operating parameters of the plant in which the hydrocyclone mixer was located to be varied, particularly variations in the rate of aeration and/or the rate of incoming feed material could not be easily tolerated. Furthermore, the hydrocyclone mixer could only be used in accordance with its design parameters of say 3 $m^3$ per hour irrespective of the feed rate of incoming waste material. This in turn meant that the hydrocyclone was specific to a particular type of waste material and a particular capacity of treatment in a particular plant, ie., there was no flexibility or adjustability of using the hydrocyclone. Thus, the operation rate of the in line hydrocyclone mixer could not be adjusted and the hydrocyclone could not be used in other applications since it was dedicated to one specific separation process.

Therefore, there is a need for a system which allows aeration of material, particularly in the separation tank to be maintained when there is an interruption to the flow of incoming waste material for treatment. Additionally, there is a need for a hydrocyclone mixer arrangement that can be adjusted to take into account different operating conditions and parameters, particularly different feed rates of incoming waste material to be treated, and different materials to be treated.

Accordingly, it is an aim of the present invention to address these needs by providing a method and apparatus suitable for use in separating materials from each other in which there is a recirculation loop that allows material in a separation tank to be continuously aerated or enabling aeration to be maintained even when supply of incoming waste material for treatment is interrupted.

According to a first aspect of the present invention there is provided an apparatus for use in treating a waste material by aeration to substantially separate contaminants from the waste material including:

an incoming waste material feed stream;

a separation means for at least partially separating the waste material of the incoming feed stream into an aerated portion containing a major amount of the contaminants separated from the incoming feed stream and a partially treated portion containing a residual or minor amount of contaminants; and a recirculation loop provided with a mixer means for aerating the partially treated portion for return to the separation means in an aerated condition such that the recirculation loop can be operated independently of the incoming waste material feed stream in order to maintain aeration conditions in the separation means thereby preventing the aerated portion from substantially deaerating and fouling the separation means.

According to a further aspect of the present invention there is provided a method of treating waste material by aeration or similar to substantially separate contaminants from the waste material including the steps of providing an incoming waste material feed stream;

at least partially separating the waste material in a separation means into a substantially aerated portion containing a major amount of the contaminants separated from the incoming feed stream and a partially treated portion containing a residual or minor amount of contaminants passing the partially treated portion through a recirculation loop having a mixer means;

aerating the partially treated portion by the use of the mixer means and returning the aerated partially treated portion to the separation means;

such that the returned aerated partially treated portion maintains aeration conditions in the separation means thereby preventing the substantially aerated portion containing the major amount of contaminants from deaerating and fouling the separation means.

Typically, the rate of incoming waste material is variable. More typically, the rate is between about 0 and 30 m$^3$/HR. However, it is to be noted that the incoming feed can be at any rate.

Typically, the waste material is a waste water. More typically, the waste is from a food or beverage processing plant. Even more typically, the waste water is from a coconut processing plant. However, it is to be noted that the apparatus and process of the present invention is applicable to all types of industrial, chemical, food or beverage waste water processing.

Typically, the process of the present invention results in significant reductions in the amounts of Biological Oxygen Demand (BOD), Chemical Oxygen Demand (COD), Total Suspended Solids (TSS) and Fats, Oils and Greases Content (FOG).

Typically, the incoming waste water feed stream is pretreated before being admitted to the separation means. Typically, the separation means is a separation vessel, preferably a tank and more preferably provided with a diffuser and a means for discharging the fraction containing the major amount of contaminants.

Typically, the mixer means is a hydrocyclone mixer. More typically, the hydrocyclone aerates the waste water by mixing air or other gas under conditions of shear. Even more typically, the hydrocyclone mixer is operated at a predetermined rate irrespective of the rate of the incoming feed of waste water. Even more typically, this rate can vary from 1 to 50 m$^3$/HR, preferably from 5 to 40 m$^3$/HR, more preferably from 10 to 30 m$^3$/HR and most preferably at about 20 m$^3$/HR.

Typically, the hydrocyclone mixer is described in International Patent Application No. PCT/AU98/00691.

Typically, the recirculation loop returns aerated partially treated waste water either directly or indirectly to the separation tank. More typically, the return of the recirculation loop is at a location or level corresponding to the position, level or location of the diffuser which is typically a diffuser plate or similar. Even more typically, the return of the recirculation loop is at a location remote from the separation tank.

Typically, the recirculation loop returns the aerated partially treated waste water to an intermediate location remote from the separation tank where it is mixed with incoming feed material prior to being introduced into the separation tank. It is to be noted that material being aerated in the recirculation loop can be returned at any convenient or suitable location in accordance with requirements to operate the plant in an efficient manner for optimal removal of the contaminants from the feed waste material being treated.

The present invention will now be described by way of example with reference to the accompanying drawings in which:

FIG. 1 is a schematic flow chart representing one form of using the method and process of the present invention allowing for recirculation of partially treated waste water through the mixing hydrocyclone in order to facilitate further treatment of the waste water and to maintain aeration conditions in the separation tank.

In FIG. 1 is shown a flow chart of the paths for the different materials involved in the process of the present invention. Although this form of the present invention will be described with particular reference to experimental investigations conducted with respect to a coconut processing plant, it is to be noted that this is only one example of use of the method and apparatus of the present invention. The present invention can be used in a wide variety of diverse applications for treating different materials in a number of different ways.

Waste water or other effluent from a coconut processing plant is introduced to the treatment apparatus depicted schematically in the flow chart of FIG. 1 at feed point 2 as an incoming feed stream of waste water containing the contaminants which are to be removed from the feed stream before it is disposed of or undergoes subsequent treatment. Typically, the water admitted at feed point 2 has a BOD value of 6,720 ppm, a COD value of 33,600 ppm and a FOG value of 33,012 ppm. A chemical additive, such as a coagulant, polymer or other material is provided through feed line 4 from a suitable source such as a feed tank or other reservoir or container and added to the waste water at mixing point 6 in a suitable dosage rate in accordance with the nature and amount of material to be separated from the waste water. A particularly preferred material added to the incoming feed of waste water is a coagulant to combine or agglomerate particles in the waste water to assist in their separation later in this separation process.

A second feed line 8 is provided from feed line 4 to admit coagulant or similar additive to one or more remote locations of the apparatus as will be described in more detail later in this specification depending upon the particular waste water being treated. The waste water with added coagulant flows through feed line 10 from mix point 6 to retarder tank 12, where a chemical reaction can take place to coagulate or flocculate the contaminants of the waste water, such as for example, forming individual fibres of the waste water into clumps of fibres or the like. Retarder tank 12 can be of any suitable shape, size and type in accordance with requirements to ensure a substantial rate of reaction of coagulation or similar, including ensuring that the correct chemical reactions take place, and that the necessary specific contaminants are flocculated, coagulated or the like.

Coagulated/flocculated waste water is discharged from retarder tank 12 through conduit 14 and conveyed to a mixing point in conduit 14 which mixing point is denoted by reference number 16 where a stream of partially treated and aerated waste water in conduit 18 is also introduced into conduit 14 so as to mix with the untreated waste water stream in conduit 14 thereby reducing the concentration of contaminants in the untreated waste water stream and at least partially aerating the incoming feed stream. It is to be noted that the two flows in conduits 14 and 18 respectively which are joined at point 16 are mixed in a ratio that is predetermined to best suit the requirement of operation of the method and process to ensure optimum separation of the contaminants of the waste water. Accordingly, the flow rates in conduits 14 and 18 can be adjusted within wide limits, can be variable or can be fixed.

The partially aerated mixture is conveyed from mixing point 16 in conduit 20 and is conducted to mixing point 22 where further coagulant, flocculant, polymer or similar additive is introduced from feed line 24 at a dosage rate which has been predetermined to suit the process and requirements of the system. Feed line 24 has been provided with a suitable receptacle for containing and supplying the additive. Conduit 20 continues past mixing point 22 and is connected to separation tank 26 at a location into intermediate the top and base of the tank. The contaminants of the waste water being treated in tank 26 are separated from the waste water as a sludge which can be collected at or towards the top of separation tank 26. Separation tank 26 is provided with a diffuser, baffle arrangement or similar, such as for example, a diffuser plate 28 located part way along the height of tank 26 for dividing tank 26 into a sludge collection zone 30 located at or towards the top of tank 26 and a clear zone 32 at and towards the lower part of tank 26. The contaminants separated from the waste water are collected as sludge at the top of tank 26 in the sludge collection zone 30.

In operation of separation tank 26 aerated waste water is introduced through diffuser plate 28 so that the particles of contaminants are entrapped or otherwise entrained within or by air or other gas bubbles rising to the surface of tank 26 so that the contaminants collect as an aerated sludge at the top of tank 26. Aeration conditions are maintained in tank 26 by fresh incoming material supplied through conduit 20. A rotating scraper 34 having a scraper blade 35 is located at or towards the top of separation tank 26 and rotates so as to direct the sludge accumulating at the top of the tank in a direction towards the mouth of a collection hopper or chute 36 located at the top of tank 26 towards one side and extending from the side wall. Sludge collected in chute 36 is discharged through an outlet located at the base of chute 36 which is provided with a sloping side wall to aid in collection of the sludge and disposal through the side wall of tank 26. Conduit 38 is used to convey the sludge from tank 26 to a suitable remote location for ultimate disposal or recycling or further treatment as required or desired. Outlet 40 is provided at the lowermost point of tank 26 for removing any solid material from tank 26.

Clean or relatively clean waste water including some or a minor amount of unseparated contaminants such as suspended solids, fibres or the like are collected in clean zone 32 located beneath the level of diffuser 8. It is to be noted that the waste water in clean zone 32 and the conditions that exist in this part of the tank are substantially unaerated. Heavier solid particles removed from the incoming waste water stream fall to the extreme bottom of tank 26 which is provided with sloping walls so as to collect the heavier solid material at the very bottom of tank 26 for periodic discharge through outlet 40 as solid material for either ultimate disposal or further treatment.

Partially treated waste water, including some contaminants and suspended solids and the like which had settled into clean zone 32, is discharged from a suitably positioned outlet located at or towards the bottom of clean zone 32 into one end of conduit 42 which forms the beginning of a recirculation loop for returning the partially treated waste water material back to the separation tank 26. The other end of conduit 42 is connected to second retarder tank 44. Another mixing point 46 is provided in conduit 42 intermediate separation tank 26 and retarder tank 44.

Second feed line 8 extending from feed line 4 is connected to mixing point 46 for introducing further additives, such as coagulant/flocculant or similar which is added at mixing point to the partially treated waste water in a predetermined dosage rate so that the mixture flows to retarder tank 44 where further chemical reactions can take place in a manner similar to that described previously in connection with retarder tank 12. A typical residence time for the waste water in retarder tank 44 is from about 30 secs to 1 hour or more.

One end of conduit 48 is connected to the outlet of retarder tank 44 and the other end is connected to a suitable mixing apparatus 50 which is typically a hydrocyclone or aerator, known under the title of an IC-SEP. A valve, typically a trottle valve 52, is provided in line in conduit 48. Trottle valve 52 is pre-set to create a partial vacuum in the suction side of pump 54 for pumping partially treated material through the recirculation loop. This allows a predetermined volume of free air to be admitted into the partially treated waste water flowing in conduit 48 at mixing point 56 located between trottle valve 52 and pump 54 in order to form an aerated partially treated waste water in conduit 48. It is to be noted that adding coagulant at mixing point 56 from feed line 57 as a separation media prior to entering mixer 50 in the form of the IC-SEP stimulates growth of flocs thereby enhancing the performance of the aeration and/or separation steps of the apparatus. The growth of flocs results from controlling the volume of air mixture into the coagulant/waste water mixture which produces a relatively homogenous/uniform mixing of air, coagulant and waste water materials. Conduit 18 is connected between the outlet of mixer 50 and mixing point 16 located between conduits 14 and 20 to return the aerated partially treated waste water in the recirculation loop back to separation tank 26 in a mixture with untreated waste water in the incoming feed stream. In this manner there is always a continuous supply of aerated waste water being supplied to separation tank 26, even if there is little or not supply of waste water to feed point 2. A back pressure valve 51 is provided in conduit 18 intermediate mixer 50 and mixing point 16 to regulate the rate of return of partially treated material in conduit 18 and/or the amount of aeration of the material in conduit 18.

The resulting fully aerated/coagulated liquid formed in mixer 50 is pumped from the outlet of mixer 50 to mixing point 16 through conduit 18 where it is mixed in line with fresh untreated waste water flowing in conduit 14 which had previously been treated with coagulant/flocculant in retarder tank 12. The mixed waste water ie the essentially unaerated untreated waste water from conduit 14 and the aerated partially treated waste water from mixer 50 are conveyed to separation tank 26 where further treatment is undertaken so that more of the contaminants are removed as sludge from the waste water in tank 26. The thus treated essentially clean waste water can then be recirculated through the recirculation loop once again or as many times as required if necessary by passing this material through retarder tank 44 for further treatment and further aeration in mixer 50 for readmission to tank 26 where further separation occurs. In this manner the waste water can be recirculated as many times as possible until it is sufficiently clean for ultimate discharge and/or reuse whilst always maintaining aerated conditions in tank 26. Further, the recirculation loop can be operated by recycling partially treated waste water substantially continuously even when there is no new supply of waste water material being introduced through feed point 2. When the waste water in clean zone 32 is ready for discharge it is discharged from a suitably located clean water outlet located in the separation tank 26 at a level above that of the recirculation outlet to conduit 42 and then through conduit 58 for disposal. Conduit 58 is provided with a manometer 60 or similar arrangement and vent 62 for maintaining the level of the waste water in tank 26 at a predetermined level to ensure scrapper blade 35 contacts the sludge at the top of the liquid level in tank 26 as it rotates to direct the sludge into chute 36 for disposal of the contaminants of the waste water. Thus, clean waste water free of contaminants is produced by the apparatus and method of the present invention, and additionally aerated conditions can be maintained in tank 26 as long as required by operating mixer 50 in the recirculation loop, including when there is no supply of waste water from feed point 2.

The above described process continues as previously described with suitable chemical additives such as coagulants/flocculants being added at the various mixing points, particularly at mixing point 6 where the first dosage is added to the incoming waste water. This process continues until a suitably placed detector (not shown or described) senses that the flow of waste water in conduit 2 or 10 has stopped whereupon the introduction of additives at dosing points 6 and 22 is also stopped. Whilst the flow in conduits 10 and 14 is stopped, pump 54 can continue pumping partially treated and aerated waste water in the recirculation loop formed of conduits 20, 42, 48 and 18, separation tank 26, retarder tank 44 and mixer 50 thus ensuring that the waste water continues to be treated and that aeration conditions are maintained in the upper part of tank 26 to keep the sludge accumulating at the top of tank 26 aerated so as to prevent the contaminants from falling to the base of tank 26 or fouling the lower parts of the tank 26 or from entering the clean zone 32, thereby keeping tank 26 relatively clean. During this process free air continues to be admitted at point 56 to ensure that aeration continues and that the sludge in separation tank 26 does not deaerate and settle to the bottom of separation tank 26 which would have required the whole process to be stopped and tank 26 dismantled for cleaning. Thus, the recirculation loop can continue independently of the introduction of fresh incoming waste water for treatment. Further, the ratio of aerated waste water to incoming waste water can be adjusted easily by altering the rate of recirculation in the recirculation loop. Additionally, the amount of aeration produced in mixer 50 can be adjusted in accordance with requirements.

The mixer 50 can be operated continuously at a fixed rate. Typically, the mixer is operated at 20 m³/HR. However, mixer 50 can be operated at any suitable rate.

An analysis of the treated waste water being discharged from tank 26 through conduit 58 demonstrates that almost all of the contaminants have been removed. A typical analysis of the water being discharged through conduit 58 in trials conducted on the coconut processing plant include the following; the BOD is 371 ppm, the COD is 509 ppm and the FOG is 28 ppm. As a comparison a similar analysis of the treated waste water from a plant using an mixer/aerator with no recirculation loop revealed the following figures; BOD is 1,319 ppm, COD is 4,224 ppm and the FOG is 98 ppm. The difference in values clearly demonstrates there has been a significant reduction in the contaminants remaining in the waste water after treatment often using the independently operated recirculation loop. This demonstrates the improvement of the process and apparatus of the present invention.

The described arrangement has been advanced by explanation and many modifications may be made without departing from the spirit and scope of the invention which includes every novel feature and novel combination of features herein disclosed.

Those skilled in the art will appreciate that the invention described herein is susceptible to variations and modifications other than those specifically described. It is understood that the invention includes all such variations and modifications which fall within the spirit and scope.

What is claimed is:

1. A method of treating waste material containing at least one contaminant in a separator to substantially separate the contaminant from the waste material using aeration in which the separator is provided with a diffuser located intermediate the ends of the separator dividing the separator into a sludge collection zone located at or towards the top of the separator and a clear zone located at or towards the lower part of the separator, and a clear waste outlet located at a level in the separator above the level of a recirculation outlet, said method comprising the steps of:

introducing an incoming feed stream of the waste material containing the contaminant into the separator;

at least partially separating the waste material in the separator into a substantially aerated portion containing a major amount of the contaminant into the sludge collection zone and into a partially treated portion of the waste material having a residual or minor amount of contaminant into the clear zone;

passing the partially treated portion of the waste material through the recirculation outlet into a recirculation loop having a mixer for aerating the partially treated portion in the recirculation loop;

aerating the partially treated portion using the mixer; and, returning the aerated partially treated portion to the separator such that introduction of the returned aerated partially treated portion to the separator maintains conditions of aeration in the separator thereby preventing the substantially aerated portion containing the major amount of contaminant in the sludge collection zone of the separator from de-aerating and fouling the separator.

2. A method according to claim 1, in which a rate of incoming feed stream of waste material containing the contaminant being introduced to the separator is fixed, variable, intermittent or can be terminated or interrupted whilst conditions of aeration are maintained in the separator.

3. A method according to claim 2, in which a rate of incoming feed stream of waste material is between about 0 and 30 cubic metres per hour.

4. A method according to claim 3, in which the waste material is a waste water.

5. A method according to claim 4, in which the waste water is waste water from a food or beverage processing plant.

6. A method according to claim 4, in which the waste water is from a coconut processing plant and the contamination includes coconut fibres.

7. A method according to claim 1, in which use of the method to remove the contaminant from the waste material results in reductions in the amounts of Biological Oxygen Demand (BOD), Chemical Oxygen Demand (COD), Total Suspended Solids (TSS) and Fats, Oils and Greases Content (FOG) of the waste material after treatment.

8. A method according to claim 1, further comprising pre-treating the incoming feed stream of waste material before the stream is admitted to the separator.

9. A method according to claim 1, in which the separator is a separation vessel or tank.

10. A method according to claim 1, in which the separator is provided with the diffuser and a discharger, in which the discharger is for discharging treated waste material portion containing the major amount of contaminant from the separator.

11. A method according to claim 1, in which the mixer is a hydrocyclone mixer.

12. A method according to claim 11, in which the hydrocyclone mixer aerates the waste water by mixing air or other gas under conditions of sheer to aerate the waste material in the recirculation loop.

13. A method according to claim 12, further comprising operating the hydrocyclone mixer at a pre-determined rate irrespective of the rate of the incoming feed of waste material.

14. A method according to claim 11, in which the rate of aeration of the hydrocyclone mixer in the recirculation loop can vary from about 1 to 50 cubic metres per hour, from about 5 to 40 cubic metres per hour, from about 10 to 30 cubic metres per hour, and at about 20 cubic metres per hour.

15. A method according to claim 1, in which the recirculation loop returns aerated partially treated waste water either directly or indirectly to the separator.

16. A method according to claim 1, in which the separator is provided with return for the recirculation loop for returning the aerated partially treated portion into the separator, wherein the return is located at a location or level of the separator corresponding to the position of the diffuser.

17. A method according to claim 1, in which the diffuser is a diffuser plate.

18. A method according to claim 1, in which the separator is provided with a return for the recirculation loop for returning the aerated partially treated portion into the separator, wherein the return is provided with a mixing point located at an intermediate location of the recirculation loop for mixing additional incoming feed material with the aerated partially treated waste material prior to the waste material being introduced into the separator.

19. A method according to claim 1, in which the recirculation loop is provided with conduits or feed lines, through which one or more additives are introduced into the recirculation loop for mixing with the aerated partially treated portion.

20. A method according to claim 19, further comprising adding additives to combine, agglomerate or bind the contaminant together to form larger sized particles, wherein the additives include flocculants, coagulants, polymers or other chemical materials.

21. A method according to claim 1, further comprising adding additives at on or more different locations throughout the method, including adding additives at a location associated with the incoming feed stream, at a location associated with the partially treated stream in the recirculation loop either before or after aeration, and/or at a location associated with the combined aerated incoming feed stream and partially treated recirculated stream.

22. A method according to claim 1, in which the ratio of the amount of incoming feed stream to the amount of recirculated stream is variable.

23. A method according to claim 1, further comprising introducing the waste material to the separator through the diffuser so that the contaminant is entrapped or otherwise entrained within or by air or other gas bubbles rising to the surface of the separator thereby allowing the contaminants to be collected as an aerated sludge at the top of the separator in the sludge collection zone.

24. A method according claim 23, in which the separator is provided with a scraper assembly having a scraper blade for moving or directing the aerated sludge collected at or towards the top of the aerator in the sludge collection zone for discharge from the separator.

25. A method according to claim 24, further comprising rotating the scraper blade at or towards the top of the separator to more or less continually discharge the aerated sludge from the top of the separator.

26. A method according to claim 1, in which the separator is provided with an outlet located at or towards a lowermost point of the separator for removing any solid material accumulating at a base of the separator.

27. A method according to claim 1, further comprising collecting the contaminant separated from the waste material as sludge in the sludge collection zone.

28. A method according to claim 1, in which the clear zone is substantially unaerated.

29. A method according to claim 1, further comprising removing the partially treated waste portion, including some contaminant and suspended solids from the clear zone for recirculation through the recirculation loop to the mixer and back to the separator.

30. A method according to claim 1, in which the recirculation loop further includes a retarder tank.

31. A method according to claim 30, further comprising holding the partially treated waste portion from the clear zone in the retarder tank for a period of time from at least 30 seconds to one hour to assist in removal of contaminant from the waste material.

32. A method according to claim 23, in which the diffuser is a diffuser plate.

* * * * *